United States Patent [19]

Touzet

[11] Patent Number: 5,088,169
[45] Date of Patent: Feb. 18, 1992

[54] SHOTGUN SHELL TRIMMER

[76] Inventor: Lorenzo J. Touzet, 10831 SW. 33rd St., Miami, Fla. 33165

[21] Appl. No.: 706,028

[22] Filed: May 28, 1991

[51] Int. Cl.$^5$ .......................... F42B 5/26; B21D 51/54
[52] U.S. Cl. .......................................... 29/1.32; 86/44
[58] Field of Search .................. 29/1.3, 1.31, 1.32; 42/90; 82/70.2; 86/23, 29, 31, 36, 44

[56] References Cited

U.S. PATENT DOCUMENTS

| | | | |
|---|---|---|---|
| 389,024 | 9/1888 | Stein . | |
| 2,406,170 | 8/1946 | Smiley | 29/1.32 |
| 2,744,307 | 5/1956 | Smiley | 29/1.32 |
| 3,251,114 | 5/1966 | Lewis | 29/1.32 |
| 3,818,563 | 6/1974 | Bequlieu | 29/1.32 |
| 4,686,751 | 8/1987 | Gracey | 29/1.32 |
| 4,754,684 | 7/1988 | Borgheresi | 86/24 |

OTHER PUBLICATIONS

Lyman Products Corporation, Shotshell Handbook, 3rd edition, Aug. 1984, pp. 2, 31, 32, 66, 67.
Hornady Manufacturing Company, Inc., Hornady Handbook of Cartridge Reloading, Rifle-Piston, third edition, 1980, cover page, pp. ii, 14, 15.

Primary Examiner—Timothy V. Eley
Attorney, Agent, or Firm—Robert M. Schwartz; Edward I. Mates

[57] ABSTRACT

A machine to trim a used shotgun shell to an adjustable precise length with a uniform length around the circumference of the trimmed shell. The cut edge is smooth and lies in a plane of cutting essentially normal to the longitudinal axis of the trimmed shotgun shell.

14 Claims, 3 Drawing Sheets

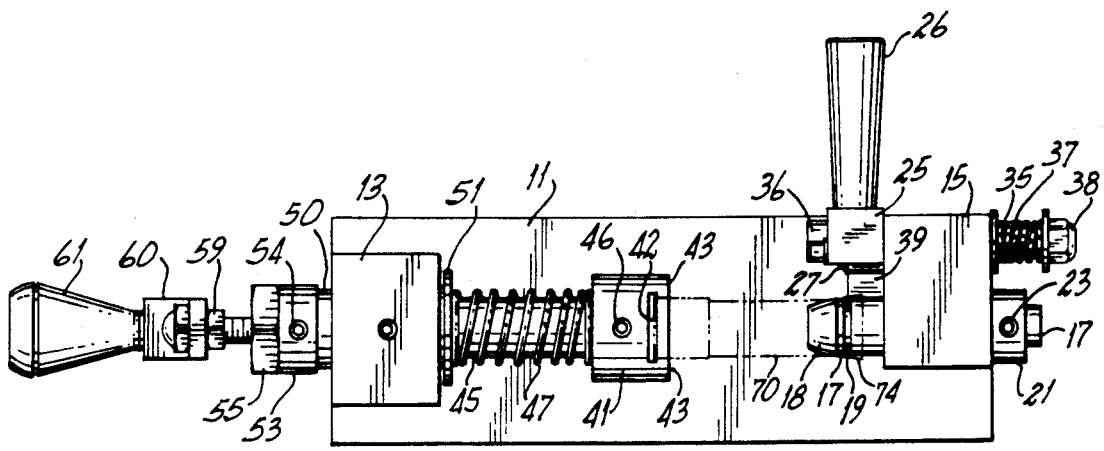
FIG - 1 -
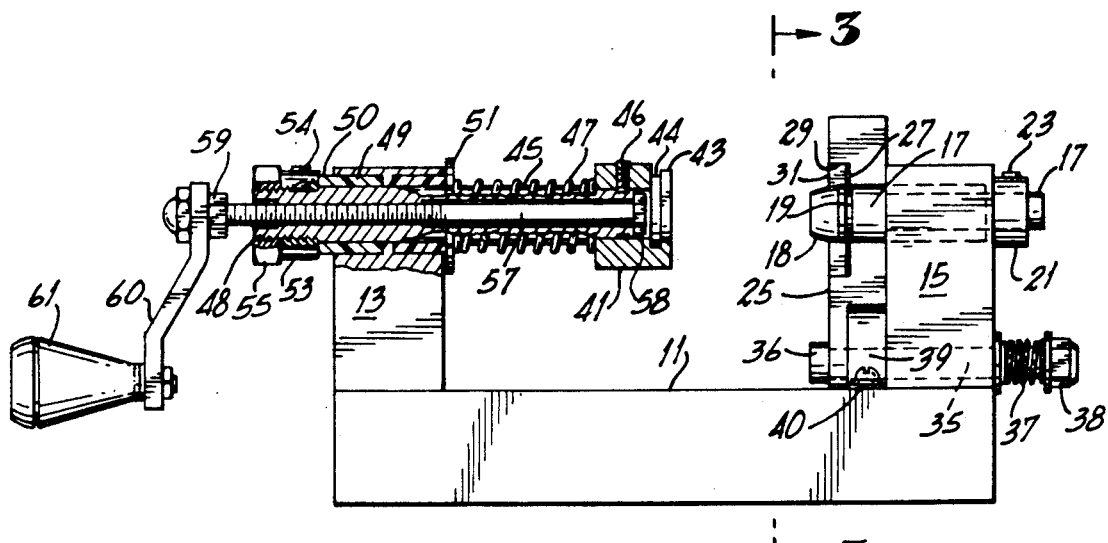
FIG - 2 -

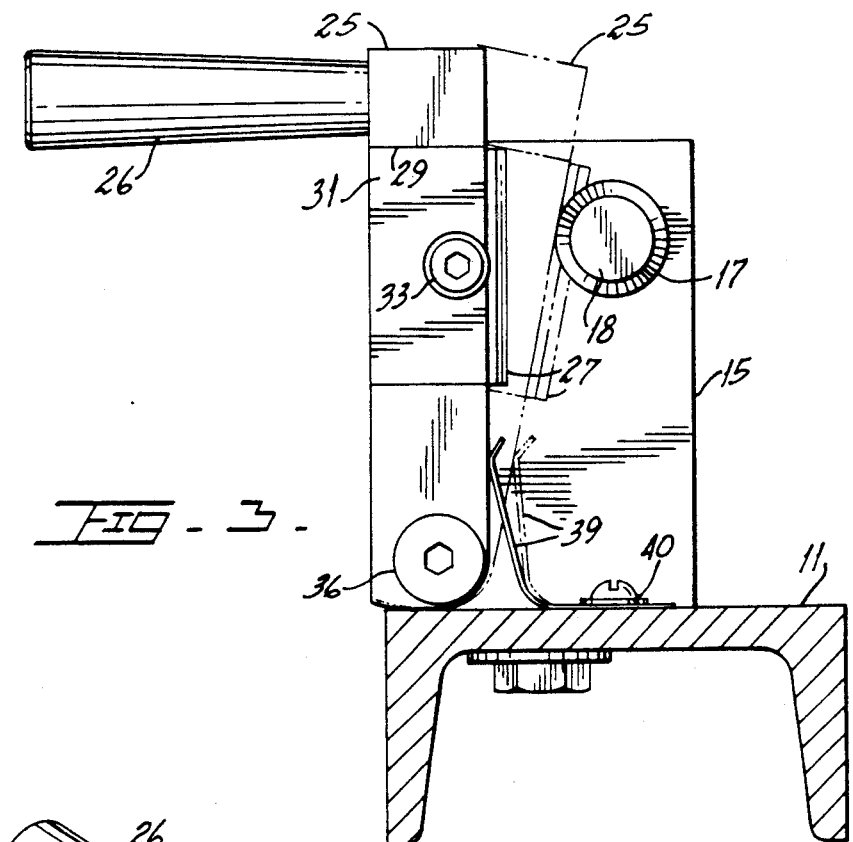
FIG-3-
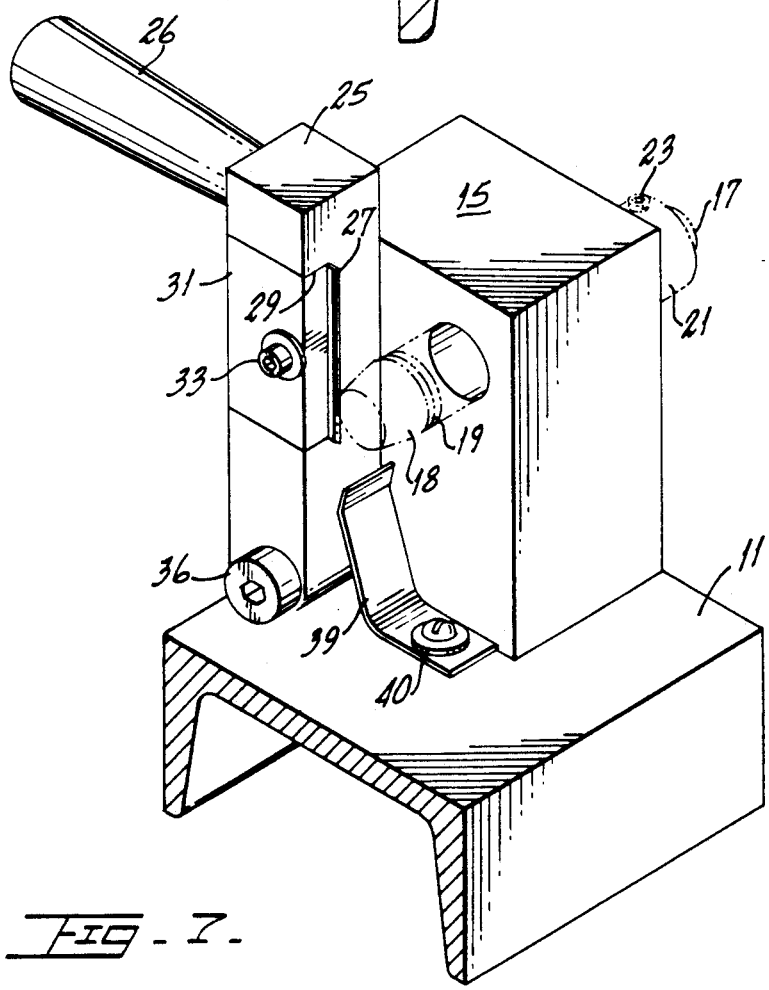
FIG-7-

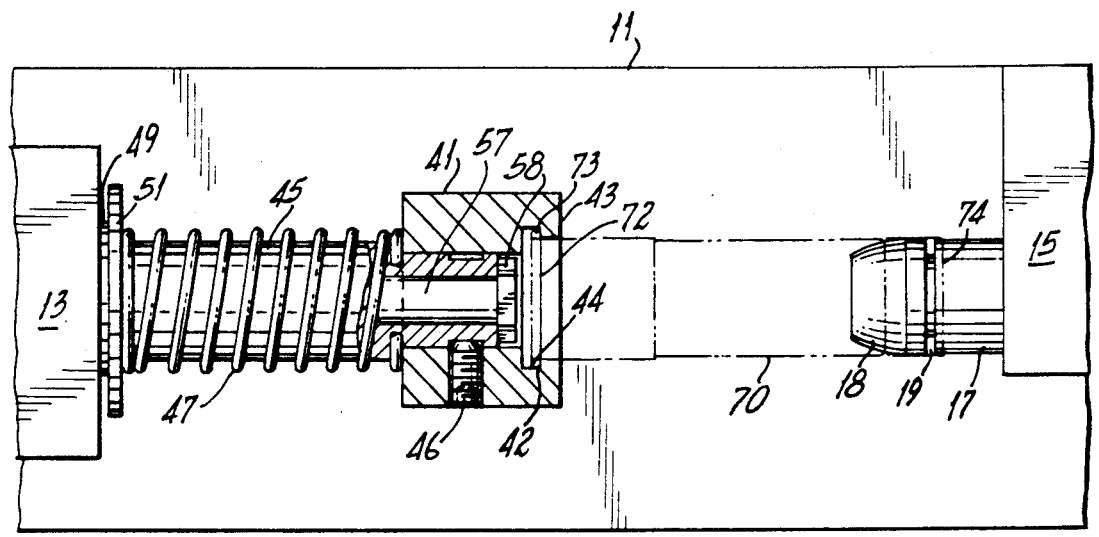
FIG-4-
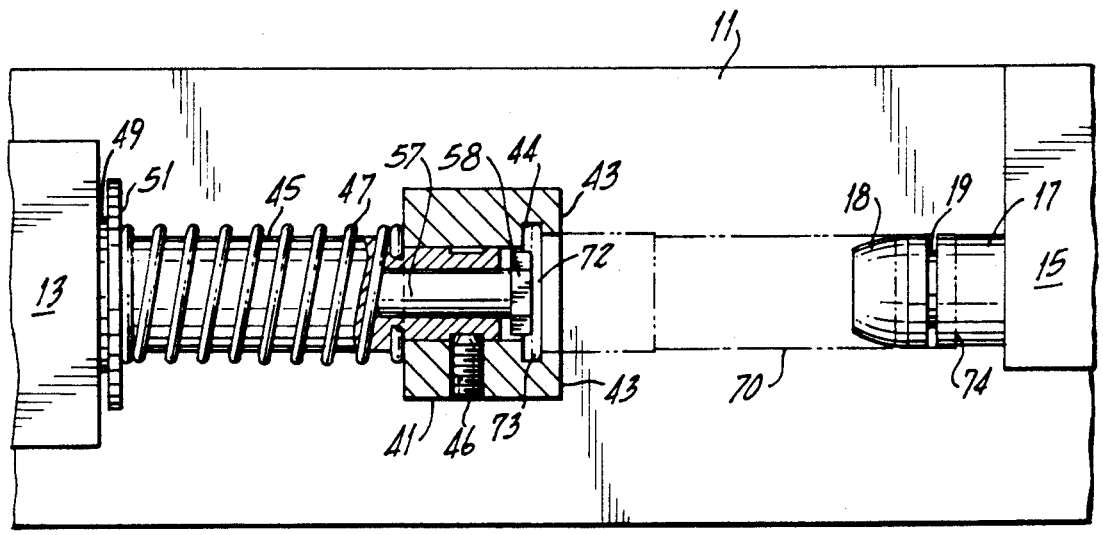
FIG-5-
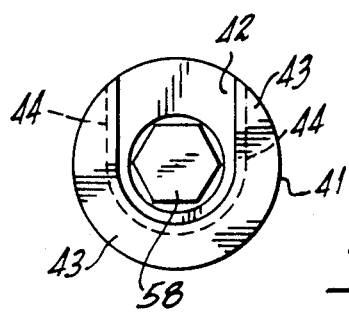
FIG-6-

SHOTGUN SHELL TRIMMER

BACKGROUND OF THE INVENTION

This invention relates to a machine designed to trim shotgun shells to any desired length and to reclaim shells that have been distorted due to discharge and are desired for reclaiming by shotgun enthusiasts.

Since newly fabricated shotgun shells are quite expensive, and spent shells are relatively inexpensive, many people prefer to renovate shotgun shells for reuse in such a manner that the renovated shotgun shells of any caliber have identical shapes desired and that they are of uniform length throughout the entire circumference of the shell so that the renovated shells of any given caliber can be filled with a predetermined wad, charge and powder and closed uniformly to obtain uniform performance of any shell, depending on its caliber.

The problems of the prior art will be better understood in the light of a description of various references that have come to the attention of the inventor as the result of a novelty search.

DISCUSSION OF PRIOR ART

U.S. Pat. No. 389,024 to Stein discloses a shell cutter which uses a rotating cutter to trim the edge of a shell. Instead of cutting the shell straight across its axis in a direction normal to the axis of the shell, a spiral cut is obtained in the cut edge. The detriments of a spiral cut will be discussed hereafter.

U.S. Pat. No. 2,406,170 to Smiley provides a rotating blade of unique construction that trims the lip of a cartridge in such a manner that requires special blade construction to chamfer the inner and outer faces of the cartridge in a simultaneous operation. Such construction is complicated and expensive.

U.S. Pat. No. 2,744,307 to Smiley trims a brass cartridge case by four steps including (1) removing excess brass from the inside of a cartridge case neck, (2) trimming the edge of the neck which reduces the length of the cartridge case, (3) chamfering the outside of the case neck, and (4) chamfering the inside of the case neck. This device is incapable of cutting plastic as is the case with the patents referred to previously. The need to chamfer the inner and outer surfaces of the case neck requires complex structure.

U.S. Pat. No. 3,251,114 to Lewis trims a cartridge which requires deburring the inside mouth after the trimming. It would be preferable if a device could be found that does not require deburring subsequent to the spiral trimming operation.

U.S. Pat. No. 3,818,563 to Beaulieu uses a rotating cutter 34 to trim the edge of a cartridge case spirally. It does not cut normal to the case to provide a straight cutting edge for the cut cartridge case.

U.S. Pat. No. 4,686,751 to Gracey uses a complicated rotating cutter to provide both a cutting edge and to give an inside chamfer to the end of a cartridge case being trimmed. The cutter assembly is too complicated as it also includes an outside deburring edge.

U.S. Pat. No. 4,754,684 to Borgheresi cuts a shotgun shell by rotating a cutter against the inside surface of the shell to be trimmed. This trims the shell in a screw motion rather than cutting straight across. As a result, the trim develops a spiral cut.

When a shell is cut spirally along its edge, it is difficult to fold over different portions of the end to arrange a symmetrical closing. Unless the closing is symmetrical, it is difficult to assure a repetitious performance from shell to shell of renovated shells.

It would be beneficial for the shotgun shell trimming art to develop a small machine capable of cutting and forming a cartridge from a spent cartridge that enables the cut to extend normal to the axial length of the cartridge rather than in a spiral so as to provide a smooth edge at the mouth of the cartridge case after trimming. These and other benefits of this invention will be understood in the light of a description of this invention that follows.

BRIEF DESCRIPTION OF THE INVENTION

The objects of this invention are obtained by a machine that supports a spent cartridge in a fixed position between a portable cartridge base holder and a fixed mandrel that receives an open mouth of the cartridge case. The mandrel is provided with a circumferential groove along a cutting plane normal to the mandrel axis. A blade is movable in said cutting plane between a groove engaging position and a recessed position. Means is provided to adjust the position of an element that engages the base of the shell within the cartridge case holder along said mandrel axis to bias the shell from the base holder toward the mandrel, and establish an axial distance from the shell base engaging member to said plane of cutting normal to an axis of rotation of the cartridge shell that determines the length of the shell after cutting. The blade is held in fixed position within said circumferential groove while the shell to be trimmed, by virtue of its being biased over the mandrel, is rotated about its axis and supported and biased into the cutting position throughout its rotation. Thus, the machine of this invention is capable of providing a smooth cut across the open mouth of the shell that is being trimmed in a plane normal to the axis common to the shell and the mandrel and insuring uniform size and shape of cut shells of any predetermined length. The machine is readily adjustable to accommodate for cutting different lengths.

A preferred embodiment of this invention comprises a machine having a front tower with an axially extending aperture therethrough, an outer axle axially adjustable relative to said front tower and having an axially extending internally threaded aperture, an externally threaded inner axle bolt constructed and arranged to be axially adjustable relative to said outer axle within limits defined by stop means, a shell base holder fixed to the rear end of the outer axle to rotate therewith, a coil spring constructed and arranged around said outer axle to bias said shell base holder rearward of said front tower, stop means constructed and arranged around the outer axle in front of the front tower and adjustable in position along said outer axle to engage said front tower and limit the backward movement of said shell base holder, crank means or motor means to rotate said inner axle bolt, first to move said inner axle bolt relative to said outer axle until an enlarged head at the rear end of said inner axle bolt reaches a predetermined axial position and then to rotate simultaneously with said outer axle while said enlarged head remains in said axial position wherein the bolt head is a fixed distance from a plane of cutting conforming to a length desired for the trimmed shell, a back tower spaced to the rear of the front tower, a base supporting the front tower and said back tower in spaced relation, means on said shell base holder for receiving a flanged base of a shotgun shell having an open mouth extending rearward of said flange base, a mandrel aligned axially with said inner axle bolt and said outer axle and fixed to said back tower to extend forward from said back tower to a front end constructed and arranged to fit within said open mouth of said shotgun shell, a circumferential groove around said mandrel forward of said back tower to define said plane of cutting normal to the axis of alignment common to said inner axle bolt, said outer axle and said mandrel, a blade holder housing pivotally supported on said back tower, a blade rigidly supported by said blade holder housing for movement between a recessed position within said plane of cutting spaced from said circumferential groove and a shell engaging position within said circumferential groove, whereby, when said shotgun shell to be trimmed is clamped between said shell base holder and said mandrel with said head of said inner axle bolt occupying said predetermined axial position, said blade holder housing is pivoted to bring said blade into groove engaging position and said inner axle bolt, said outer axle and said shell base holder are rotated in a given direction, said blade cuts through the thickness of the shell near its open mouth to produce a smooth cut in said plane of cutting that is normal to the axis of said shell an exact distance from said base conforming to the axial distance from said head of said inner axle bolt to said circumferential groove.

DESCRIPTION OF PREFERRED EMBODIMENT

In the drawings that form part of a description of a preferred embodiment,

FIG. 1 is a top plan view of a machine conforming to a preferred embodiment of this invention with a shell to be trimmed (shown in phantom) inserted between an enlarged head of an inner axle bolt within a shell base holder and a mandrel;

FIG. 2 is a longitudinal elevation taken at right angles to FIG. 1 with the inner axle bolt recessed to enable the shell base to be received within the shell base holder, with parts in section to further illustrate the invention. In this figure the shell to be trimmed is omitted for clarity.

FIG. 3 is a transverse view taken along the line 3—3 of FIG. 2 showing a cutter blade in its shell engaging position in phantom and in its recessed position in solid lines.

FIG. 4 is an enlarged fragmentary top view of this invention showing the rear head of an inner axis bolt disengaged from the base of a cartridge case, shown in phantom.

FIG. 5 is a view similar to FIG. 4 showing the rear head engaging the base of the cartridge case to bias the latter rearwardly around said mandrel.

FIG. 6 is a view along the line 6—6 of FIG. 4 showing how the cartridge base holder has an upper recess to facilitate receipt of a cartridge holder base therein.

FIG. 7 shows a blade holder assembly in perspective to facilitate the showing of certain structural elements.

DESCRIPTION OF PREFERRED EMBODIMENT

A preferred embodiment of the present invention comprises an aluminum base 11 having an upper horizontal surface that supports a front tower 13 at its front end (to the left of FIGS. 1 and 2) and a back tower 15 at its back end (to the right of FIGS. 1 and 2). Back tower 15 has an axial aperture to receive a mandrel 17. The latter has an inwardly tapered front end 18 and a circumferential groove 19 in its forward portion. Groove 19 defines a cutting plane that is normal to the axis of mandrel 17. A collar 21 behind back tower 15 is secured to the back end of mandrel 17 by an Allen bolt 23. Collar 21 is fixed to abut the back surface of back tower 15 so that the mandrel 17 extends axially throughout the thickness and forward of the front wall of back tower 15 and its circumferential groove 19 is located forward of back tower 15 to define said plane of cutting normal to the axis of mandrel 17.

A blade holder 25 in the form of a housing is rotatably supported relative to back tower 15. Blade holder 25 has a handle 26 extending outward from its upper end and includes a rectangular blade 27 received in a rectangular recess 29 that is closed with a blade support block 31. The latter is held within recess 29 by a screw 33 (FIGS. 3 and 7) that also extends through a convenient opening (not shown) through the thickness of blade 27.

Back tower 15 is also provided with a lower axial aperture that receives an axially extending shoulder screw 35 having an enlarged head 36 at its front end and a spring 37 wound around the rear end of shoulder screw 35 between a pair of washers and a lock nut 38. In this manner, blade holder 25 is pivotally attached with respect to back tower 15 about an axis defined by shoulder screw 35. In addition, spring 37 around shoulder screw 35 biases shoulder screw 35 so that its enlarged head 36 bears against the front surface of blade holder 25 so as to hold the blade holder 25 in slidable relation relative to the front wall of back tower 15.

A bent flat spring 39 has its bent upper portion abutting an inner wall of blade holder 25 and is attached to base 11 using a flat spring holder 40 in the form of a screw or the like. Therefore, flat spring 39 biases blade holder 25 to hold the blade 27 in offset position relative to circumferential groove 19 of mandrel 17 when flat spring 39 bears against the inner wall of blade holder 25.

Handle 26 makes it possible to manually rotate or pivot blade holder 25 into a position wherein rectangular blade 27 is inserted into the circumferential groove 19 within a cutting plane along which a cartridge is to be trimmed. The blade 27 and mandrel 17 are constructed and arranged in such a manner that blade 27 enters circumferential groove 19 only a limited distance so that blade 27 is spaced from the floor of groove 19 at maximum insertion. This feature preserves the sharpness of blade 27. The front end 18 of mandrel 17 is shaped to receive an open mouth 74 of a cartridge shell 70 shown in phantom in FIG. 1.

The apparatus also includes a shell base holder 41 whose back end has a recess 42 defined by flanges 43 that define a groove 44 just in front thereof. An outer axle 45 extends rearward from an axially extending aperture through front tower 13 aligned with the aperture through rear tower 15 that receives mandrel 17. An Allen bolt 46 fixes shell base holder 41 to the back end portion of outer axle 45. A spiral spring 47 is coiled around the rear portion of the length of outer axle 45. Bushings 49 are provided in the axial aperture of front tower 13 to permit free rotation of outer axle 45 therewithin. Front washer 50 and rear washer 51 flank front tower 13 to protect the ends of the bushings 49. Spiral spring 47 biases shell base holder 41 rearward of front tower 13.

Outer axle 45 has an externally threaded front portion 48 to receive stop means in the form of a collar 53, adjustably attached to outer axle 45 by Allen bolt 54, and a lock nut 55 that threadedly engages an externally threaded front end portion 48 of outer axle 45 to define a rear stop position for shell base holder 41 to be described further later. An externally threaded inner axle bolt 57 having an enlarged rear head 58 mates with a portion of the outer axle 45 which is internally threaded. Front and back lock nuts 59 connect a crank 60 and crank handle 61 to the front end of threaded inner axle bolt 57. Rotation of crank 60 causes threaded inner axle bolt 57 to rotate therewith. Enlarged rear head 58 is shown of hexagonal cross-section, but other cross-sections may be used without departing from this invention.

The external threadings of the inner axle bolt 57 and the internal threadings of the outer axle 45 mesh for a portion of their length to enable the crank 60 and inner axle bolt 57 to rotate in one direction to move enlarged rear head 58 axially rearward beyond the rear end of the outer axle 45 for a limited axial distance within shell base holder 41 until the back ends of the meshing threads are axially aligned. The setting of the stop means comprising collar 53 and lock nut 55 helps determine an axial position at which outer axle 45 is fixed. Enlarged rear head 58 of threaded inner axle bolt 57 can occupy an axial position related to the position fixed for outer axle 45 depending on the axial positions of the rear ends of their overlapping threaded portions.

The construction and arrangement of inner axle bolt 57 to outer axle 45 is such that rotation of the inner axle bolt 57 relative to outer axle 45 by rotating crank 60 in one direction moves enlarged rear head 58 axially rearward into shell base holder 41 beyond the rear end of outer axle 45 until the rear end of the external threadings of inner axle bolt 57 is aligned with the rear end of the internal threadings of outer axle 45. Further backward axial movement of inner axle bolt 57 relative to outer axle 45 is prevented and further rotation of inner axle bolt 57 by rotating crank 60 in said direction causes both inner axle bolt 57 and outer axle 45 to rotate in unison without changing the axial position of enlarged head 58 from a cartridge engaging position shown in FIG. 5. In such a position, the meshing threads at the rear ends of outer axle 45 and inner axle bolt 57 may lock on further rotation of crank 60 in said direction, thereby making it difficult to move the enlarged head 58 axially forward when said threads are meshed. However, when shell base holder 41 is held when reverse rotation of crank 60 begins, such simultaneous holding and reverse rotation moves inner axle bolt 57 to the front, thereby moving enlarged head 58 to a recessed position to allow removal of a trimmed cartridge and insertion of a cartridge base 72 of a succeeding cartridge to be trimmed relative to cartridge base holder 41, as will be explained later.

Stop means comprising collar 53 and lock nut 55 is adjusted so as to provide a predetermined fixed axial position for outer axle 45 along the axis defined by mandrel 17. The set position of stop means 53, 55 determines how far enlarged rear head 58 of threaded inner axle bolt 57 is permitted to move axially to the rear of a cartridge base receiving surface of cartridge base holder 41 to set an axial position for enlarged head 58 at a predetermined distance from the cutting plane that extends through circumferential groove 19 in the front end of mandrel 17. This predetermined distance equals the length desired for a trimmed cartridge.

A cartridge shell 70 is shown having a base 72, base flange 73 and an open mouth 74. Shell 70, which is to be trimmed in length exactly throughout its entire circumference from its base 72 to its open mouth 74, is inserted into the shell base holder 41 through recess 42 with its flange 73 received in groove 44 defined by flanges 43 and the shell base 72 facing forward against the base receiving surface, and open mouth 74 of the shell 70 extending around the portion of mandrel 17 to the rear of circumferential groove 19. Thus, when the stop means 53, 55 is adjusted properly and the maximum backward position for enlarged head 58 established by the distance between the rear end of enlarged rear head 58 and the cutting plane defined by circumferential groove 19 when inner axle bolt 57 is extended rearwardly is such as to provide an exact length desired for the shell after trimming.

The blade holder 25 is kept in recessed position so as to enable the open mouth 74 of shell 70 to be inserted over the front end 18 of mandrel 17 with the end to be trimmed extending rearward of the circumferential groove 19. The handle 26 is used to rotate blade holder 25 so that blade 27 engages the circumferential groove 19 when outer axle 45 and threaded inner axle bolt 57 are rotated in unison to rotate the shell 70 while blade 27 is inserted in alignment with the circumferential groove 19. This provides a uniform length of cut throughout the entire circumference of the open mouth of the shell 70 that has been trimmed.

Mandrel 17 is so constructed that there is a clearance opening within the back tower 15 that surrounds the mandrel 17. This enables any excess length of the shell 70, particularly its open mouth portion 74, to move rearward beyond the circumferential groove 19 and around the end of the mandrel 17 immediately to the back of circumferential groove 19 when enlarged head 58 biases rearward against shell base 72. Then shell 70 is cut by rotating crank 60 while enlarged head 58 biases shell 70 to rotate the latter around fixed mandrel 17 with circumferential groove 19 a fixed distance from the enlarged rear head 58 of threaded inner axle bolt 57 so as to insure that a precise length of shell remains after a trimming operation. Thus, the present invention provides uniform length and smooth end cuts in a plane normal to the axis of the shell 70 whenever a stop means comprising collar 53 and lock nut 55 is adjusted for a particular length of shell. Different lengths of shells require different adjustments for the stop means comprising collar 53 and lock nut 55 to fix the axial position of outer axle 45, but whenever such an adjustment of outer axle position is made, it remains constant for any shells of that length that are trimmed. When shells of other lengths are required for trimming, outer axle 45 is fixed to a different axial position.

When a shell is loaded, collar 53 is supported against the front surface of front washer 50 with enlarged head 58 of threaded inner axle bolt 57 in a forwardly recessed position relative to recess 42. The open mouth 74 of shell 70 is slipped over the front end 18 of mandrel 17 which is reduced in diameter to receive the open mouth portion 74. The base 72 of shell 70 is slipped into the recess 42 between flanges 43 with shell flange 73 received in groove 44 of shell base holder 41 to place the shell 70 in position to be forced by rotation of crank 60 and threaded inner axle bolt 57 in a direction causing enlarged rear head 58 to move rearward into recess 42 to engage shell base 72 and bias shell 70 toward the back tower 15 so that mouth 74 moves beyond the cutting plane defined by circumferential groove 19.

Further rotation of crank 60 in said direction after the rear end of the external threadings of inner axle bolt 57 reaches the rear end of the internal threadings of outer axle 45 causes enlarged rear head 58 and the threaded inner axle bolt 57 to rotate in unison with the outer axle 45 and shell base holder 41 without any axial displacement. Shell 70 is thus forced rearwardly with its base 72 abutting the rear end of enlarged rear head 58 and its open mouth 74 sliding to the rear around mandrel 17 to the rear of circumferential groove 19 until the axial distance from enlarged rear head 58 to the cutting plane defined by circumferential groove 19 equals the desired length of trimmed shell 70. Inward pivoting of blade holder 25 brings the blade 27 into a shell cutting position in contact with the mouth portion 74 and further rotation of crank 60 in said direction causes the shell 70 to be rotated around mandrel 17 so that its portion surrounding circumferential groove 19 is cut in the cutting plane normal to the axis of shell 70 which coincides with the axis of threaded inner axle bolt 57 and outer axle 45 and mandrel 17.

When the cutting is completed, crank 60 is rotated in the opposite direction to cause threaded inner axle 57 to move axially forward to bring enlarged rear head 58 away from the base 72 of the shell that has been trimmed. Shell base holder 41 may have to be held momentarily to start the reverse rotation. It is an easy matter then to remove the trimmed shell from the shell base holder 41 through recess 42. It may be necessary to rotate shell base holder 41 to orient the recess 42 into a position for removing the trimmed shell 70 more easily. The trimming to the rear of recess 19 that has been cut from the shell is removed by sliding off the mandrel and the device is ready for the insertion of the next shell.

If the next shell is to be cut to the same length, no change in positioning is required for outer axle 45. After inserting the next shell into the shell base holder with enlarged head 58 recessed to the front in the position it occupied for removal of the previous trimmed shell, the crank 60 is rotated in the first direction until the enlarged rear head 58 of threaded inner axle bolt 57 is moved axially to the rear to the position it occupied to bias the previous shell to be trimmed. Thus, the distance between the rear surface of enlarged rear head 58 of threaded inner axle bolt 57 and the circumferential groove 19 is constant as long as the collar 53 and lock nut 55 remain fixed in position that they were set for a previous shell to be trimmed to the same length, and the fact that the blade 27 is held in the plane of cutting throughout the rotation of the shell to be trimmed about mandrel 17 makes it a smooth cut around the entire perimeter of the open end of the trimmed shell 70.

The device heretofore described provides a smooth cut and a uniform axial length of the trimmed shell completely around its circumference. This avoids the problem of the prior art and also avoids any need for further trimming on the outside and inside surface of the shell to avoid any irregularities resulting from spiral grinding that characterizes prior art devices.

This specification has met the requirements of the patent statutes for adequate disclosure of this invention by explaining the principal, preferred construction and mode of operation of a preferred embodiment of this invention and by illustrating and describing what is now considered to be its best embodiment. It is understood, however, that, within the scope of the claimed subject matter that follows, the invention may be practiced otherwise than as specifically illustrated and described.

What is claimed is:

1. A machine to trim a shotgun shell to a desired length and to develop a smooth edge in a plane of cutting essentially normal to a longitudinal axis of said shell comprising:
    a mandrel having a circumferential groove in a fixed plane of cutting, said mandrel being constructed and arranged to receive an open mouth of said shell to the rear of said circumferential groove,
    a flat blade pivotally mounted for movement in said plane of cutting into and away from said circumferential groove,
    an outer axle supported for axial adjustment to a preselected position along an axis common to an axis for said mandrel,
    a shell base holder fixed to the rear end of said outer axle and constructed and arranged to receive a base of said shell,
    an inner axle bolt constructed and arranged for limited axial movement relative to said outer axle and having a rear head received by said shell base holder, said rear head constructed and arranged to occupy a rearmost position corresponding to a preselected position for said outer axle at one limit of said limited axial movement,
    means to adjust the axial position of said outer axle to establish a desired axial distance between said rear head and said circumferential groove when said rear head occupies a predetermined rearmost position relative to said outer axle defined by said construction and arrangement for limited axial movement,
    said outer axle and inner axle bolt being rotatable in unison in one direction without any axial displacement when said rear head occupies said predetermined rearmost position relative to said outer axle, whereby
    when said shell is held between said rear head in its rearmost position and said mandrel, said blade is held within said circumferential groove, and said outer axle and inner axle bolt are rotated in unison, said shell rotates around said mandrel and said blade cuts said shell along said plane of cutting to produce a trimmed shell of a desired length defined by the distance between said rear head in said predetermined rearmost position and said circumferential groove and having a smooth cut in said plane of cutting.

2. A machine as in claim 1, further including a crank constructed and arranged to rotate said inner axle bolt and said outer axle in unison without any axial displacement when said rear head occupies said rearmost position and said crank rotates in one direction and to cause forward axial displacement of said inner axle bolt relative to said outer axle when said crank rotates in a direction opposite to said one direction.

3. A machine as in claim 1, further including a front tower supporting said outer axle and said inner axle bolt, a rear tower having an axially extending chamber through which said mandrel extends in fixed relation to said rear tower, and a base holding said front tower and rear tower in spaced relation, said outer axle having an externally threaded front end portion extending to the front of said front tower, stop means threadedly engaging said externally threaded front end portion to control a position of said outer axle axially of said front tower, an axial aperture for said outer axle, a portion of the length of said axial aperture being threaded, said inner axle bolt having a threaded portion constructed and arranged to mesh with the threaded portion of the length of said axial aperture of said outer axle to enable said inner axle bolt to move axially rearwardly relative to said outer axle when rotated in a given direction until the rear end of said threaded portion of said inner axle bolt reaches the rear end of said threaded portion of said axial aperture to cause said outer axle and said inner axle bolt to rotate in unison without any axial displacement when said head occupies a predetermined position a given distance from said plane of cutting equal to the length desired for said shell after trimming.

4. A machine as in claim 3, wherein said meshed threaded portions of said outer axle and said inner axle bolt are constructed and arranged to enable said head to move axially forward of said shell base holder when said inner axle bolt is rotated in a direction opposite said given direction relative to said outer axle.

5. A machine as in claim 3, further including a spring spirally wound around said outer axle between said front tower and said shell base holder to bias the position of said shell base holder to the rear of said front tower.

6. A machine as in claim 3, wherein said shell base holder is an essentially enclosed housing having an outer recessed portion for receiving the base portion of a shell to be trimmed when an open mouth at the rear of said shell extends rearward around said mandrel and said rear head is located forwardly of said predetermined position.

7. A machine as in claim 3, comprising a blade holder pivotally mounted to said rear tower and constructed and arranged to hold said blade for pivotal movement in said plane of cutting.

8. A machine as in claim 7, further including a spring fixed to said blade holder and constructed and arranged to engage said base in such a manner as to bias said blade holder in such a direction as to urge said blade into a recessed position spaced from said circumferential groove.

9. A machine as in claim 8, said blade holder being constructed and arranged to limit the amount of entry of said blade into said circumferential groove.

10. A machine as in claim 9, wherein said blade holder has a cut-out portion of rectangular configuration to receive said flat blade and a blade holding block is fixed securely to said cut-out portion to grip said blade therewithin.

11. A machine as in claim 7, wherein said blade holder has an axial aperture, a shoulder screw extending through said axial aperture, enlarged heads for said shoulder screw and spring biasing means surrounding said shoulder screw between said rear tower and one of said enlarged heads to bias said pivotally mounted blade holder against said rear tower.

12. A machine to trim a shotgun shell to a desired length and to develop a smooth edge for said shell in a plane of butting essentially normal to a longitudinal axis of said shell comprising:
   a mandrel supported along said longitudinal axis for supporting an open ended portion of said shell along said axis,
   a circumferential groove near the front end of said mandrel defining a plane of cutting,
   an outer axle having a cartridge shell base holder at its rear end, said outer axle supported for axial adjustment to a position wherein the axial distance from a rear end of said outer axle to said circumferential groove is sufficiently longer than the length desired for said trimmed shell to receive a base of said shell in said shell base holder while said open ended portion fits around said mandrel to the rear of said circumferential groove,
   an inner axle bolt within said outer axle constructed and arranged for limited axial movement relative to said outer axle between a front position permitting entry of said base into said shell base holder while said open ended portion fits over said mandrel and a rear position for said inner axle bolt wherein an enlarged rear head of said inner axle bolt is spaced an axial distance from said circumferential groove equal to the length desired for said trimmed cartridge shell, whereby said inner axle bolt biases said cartridge shell to the rear of said mandrel,
   a flat blade supported for movement in said plane of cutting between a recessed position spaced from said circumferential groove and a cartridge cutting position along said circumferential groove, and
   means to rotate said outer axle, said shell base holder, said inner axle bolt and said shell in unison when said inner axle bolt occupies its said rear position and said blade occupies its cartridge cutting position.

13. A machine as in claim 12, further including crank means rotatable with said inner axle bolt in one direction to move said inner axle bolt relative to said outer axle to said rear position for said inner axle bolt and to rotate said inner axle bolt, said outer axle, said shell base holder and said shell in unison without axial displacement of said enlarged rear head during further rotation of said crank means in said one direction.

14. A machine as in claim 13, constructed and arranged to move said enlarged rear head from said rear position to said front position when said crank means rotates in a direction opposite said one direction after a shell is trimmed.

* * * * *